(12) United States Patent (10) Patent No.: US 7,456,785 B2
Houtman (45) Date of Patent: Nov. 25, 2008

(54) NAVIGATION SIGNAL DIFFERENTIAL ACQUISITION METHOD AND SYSTEMS THEREFOR

(75) Inventor: Tom Houtman, Ottawa (CA)

(73) Assignee: Transcore Link Logistics Corporation, Ontario (CA)

( * ) Notice: Subject to any disclaimer, the term of this patent is extended or adjusted under 35 U.S.C. 154(b) by 0 days.

(21) Appl. No.: 11/842,508

(22) Filed: Aug. 21, 2007

(65) Prior Publication Data

US 2008/0122692 A1 May 29, 2008

Related U.S. Application Data

(60) Provisional application No. 60/861,450, filed on Nov. 29, 2006.

(51) Int. Cl.
*G01S 1/00* (2006.01)
(52) U.S. Cl. .............................. 342/357.12; 342/357.06; 342/357.15
(58) Field of Classification Search ............ 342/357.02, 342/357.03, 357.06, 357.12, 357.15; 701/207, 701/213, 215
See application file for complete search history.

(56) References Cited

U.S. PATENT DOCUMENTS

| 4,601,005 | A | 7/1986 | Kilvingon |
| 7,027,486 | B2 * | 4/2006 | Sullivan ..................... 375/147 |
| 2005/0163201 | A1 | 7/2005 | Krasner |

2007/0297542 A1 * 12/2007 Sullivan ..................... 375/343

OTHER PUBLICATIONS

Booth, "Interpolative Estimation of Pattern Motion Using Bilinear Functions", Oct. 26, 2006, http://www.abooth.co.uk/opt/bilin/bilin3.html.
Schmid, et al., "Performance Evaluation of Differential Correlation for Single Shot Measurement Positioning", Proceedings of the 17th International Meeting of the Satellite Division of the Institute of Navigation Ion GNSS, Sep. 24, 2004, pp. 1998-2009.
Sousa, et al., "Partial Correlation Technique for the Acquisition of Weak GPS/Galileo Signals", Proceedings of the 61st Annual Meeting, Ion, Jun. 29, 2005, pp. 543-552.

* cited by examiner

*Primary Examiner*—Dao L Phan
(74) *Attorney, Agent, or Firm*—Caesar, Rivise, Bernstein, Cohen & Pokotilow, Ltd.

(57) ABSTRACT

A method of acquiring signals from satellites in a Global Positioning System (GPS) is disclosed. The method includes receiving navigation signals from the satellites of the GPS, down-converting to complex baseband the received navigation signals to form a first signal, digitizing samples of the first signal, nonlinear processing of the digitized samples of the first signal to form a second signal, where the nonlinear processing comprises forming a weighted sum of products of pairs of the digitized samples at different relative delays, in which one of each of the pairs has been complex conjugated, coherent averaging the second signal over integer multiples or submultiples of a spreading sequence period of the navigation signals to form a third signal, performing circular correlation processing of the third signal with a representation of each navigation signal of the navigation signals and determining a timing offset at which a correlated output energy is maximized, based on the circular correlation processing.

21 Claims, 5 Drawing Sheets

NAVIGATION SIGNAL DIFFERENTIAL ACQUISITION METHOD AND SYSTEMS THEREFOR

CROSS-REFERENCE TO RELATED APPLICATIONS

This application claims benefit of U.S. Provisional Patent Application No. 60/861,450, filed on Nov. 29, 2006. The full disclosure of this provisional application is incorporated herein by reference.

FIELD OF THE INVENTION

The present invention relates to communication methods used in satellite navigation systems. More specifically, the present invention is directed to improved methods of acquisition of spread spectrum satellite navigation signals that reduce the required computational complexity when compared to other methods.

DESCRIPTION OF RELATED ART

One of the key problems in the use of satellite navigation systems such as GPS is detection of and synchronization to the signals from the satellites (often termed "acquisition"). As a minimum, receivers must measure the carrier frequency or spreading code phase (delay), or both; typically unassisted receivers must additionally determine and track the signal carrier phase to enable data demodulation. Receivers must decide whether a navigation signal is present and can be used to form a position, velocity and/or time solution.

A number of techniques have been used to solve this problem. Many GPS receivers use hardware correlators in a scan mode. For each code phase and carrier frequency hypothesis to be tested, and for each pseudonoise signal to be tested, a correlator effectively performs signal conversion to complex baseband, despreads the signal with the desired pseudonoise reference signal, and adds the output to determine the correlation energy for the given code phase and carrier frequency. The correlators are scanned over the time and frequency hypotheses until sufficiently high correlation energy is seen to indicate a successful detection at a given hypothesis set. In the more recent designs of this type multiple correlators have been used to reduce the search time.

Frequency domain convolution has also been proposed as an acquisition technique with the potential to reduce the search time. For example, in U.S. Pat. No. 4,601,005 to Kilvington, such an approach is disclosed in which a digitized complex baseband signal consisting of the sum of signals from multiple GPS satellites as well as thermal noise is transformed via FFT to the frequency domain, multiplied by a frequency domain transformation of the pseudonoise signal from a GPS satellite, inverse transformed back to the time domain and then searched for a peak, the position of which indicates the relative code phase. With an efficient FFT processor such as a digital signal processor (DSP) this technique can provide much faster acquisition of code phase and carrier frequency than the hardware correlator approach. Because of the increased efficiency, it is also more feasible to increase the signal integration time, so the sensitivity of the receiver can be increased.

Although the frequency-domain approach is attractive, the amount of computation required can be very high, especially in unassisted receivers which have no side information (for example from a cellular radio link) on the receiver frequency error. An acquisition scheme with reduced computational complexity could provide faster acquisition or lower power consumption, or both.

Both time-domain and frequency-domain convolution suffer from a computational scaling issue with coherent integration. As the coherent integration period increases (providing better receiver sensitivity) the computation per time and frequency hypothesis increases in proportion. The loss due to frequency differences between hypothetical and true signal frequencies is increased; typically to maintain a fixed worst-case loss due to frequency offsets, the number of frequency hypotheses to be searched also increases proportionally to the coherent integration time. These two scaling effects combine so that the overall computational burden is proportional to the square of the coherent integration time.

One of the limitations to coherent integration is loss due to bit transitions in the navigation data. For example GPS broadcasts are direct sequence spread spectrum signals with a 1023-chip-long spreading sequence repeating every millisecond, multiplied by 20 millisecond long data bits carrying the broadcast data. If the coherent integration interval spans one or more bit transitions, the output correlation peak is reduced, and significant errors are introduced to carrier frequency estimates. This can be seen by considering a 40 millisecond coherent integration interval centered on a bit transition; with a noise- and interference-free input, the correlation energy is 0 at the correct time and frequency, reaching reduced maxima at the correct time but offset from the correct frequency. Any acquisition technique which removes the effect of bit transitions can make long coherent integration periods more feasible as a means of improving receiver sensitivity, and improves the effectiveness of integration even for short coherent integration periods.

Although it decreases per-sample SNR significantly, differential acquisition virtually eliminates the signal frequency offset and can strongly reduce the effect of bit transitions. This means that long coherent integration periods are feasible, which can more than mitigate the detrimental effect on SNR.

Thus, there is a need in the prior art to have systems and methods which provide acquisition in a computationally efficient processes and avoid the limitations discussed above. There is also a need for methods and systems that simplify and provide cost savings over the prior art systems.

SUMMARY OF THE INVENTION

To achieve the above and other objects, the present invention is directed to a method of acquiring signals from satellites in a Global Positioning System (GPS) is disclosed. The method includes receiving navigation signals from the satellites of the GPS, down-converting to complex baseband the received navigation signals to form a first signal, digitizing samples of the first signal, nonlinear processing of the digitized samples of the first signal to form a second signal, where the nonlinear processing comprises forming a weighted sum of products of pairs of the digitized samples at different relative delays, in which one of each of the pairs has been complex conjugated, coherent averaging the second signal over integer multiples or submultiples of a spreading sequence period of the navigation signals to form a third signal, performing circular correlation processing of the third signal with a representation of each navigation signal of the navigation signals and determining a timing offset at which a correlated output energy is maximized, based on the circular correlation processing.

Preferably, the step of nonlinear processing further includes discarding an imaginary component of the digitized samples of the first signal for short delay periods or small residual carrier frequencies. Also, the method may include rotating, on a complex plane, at least one of the second signal and the third signal so that the at least one signal falls on or near a real or an imaginary axis of the complex plane. The method may also include determining a chip timing drift rate for each of the received navigation signals and inserting or deleting samples in the digitizing samples step to compensate for the chip timing drift rate. Also, the inserting or deleting step may include passing multiple coherently averaged sections of the first signal though delay and advance filters.

Also, the method of acquiring signals from satellites may include estimating a carrier frequency the received navigation signals by dispreading the first signal with synchronized code, by determining a chip timing drift rate for each of the received navigation signals or by determining a phase angle of a detection peak of the third signal. The method may further include performing a single-pass interference cancellation process for each navigation signal. The single-pass interference cancellation process may include estimating a code phase, an amplitude and a chip timing drift for each navigation signal, comparing peak amplitudes of each navigation signal with thresholds, forming replica waveforms for each navigation signal at a test chip timing drift rate, based on the code phase, the amplitude and the chip timing drift, and offset from the test chip timing drift rate and subtracting the replica waveforms from the navigation signals.

According to another embodiment of the present invention, a receiver for acquiring signals from satellites in a Global Positioning System (GPS) is disclosed. The receiver includes at least one antenna, a receiver, connected to the at least one antenna, configured to receive navigation signals from the satellites of the GPS and a processor, in communication with the receiver. The processor is configured to down-convert to complex baseband the received navigation signals to form a first signal, digitize samples of the first signal, process, non-linearly, the digitized samples of the first signal to form a second signal, where the nonlinear processing comprises forming a weighted sum of products of pairs of the digitized samples at different relative delays, in which one of each of the pairs has been complex conjugated, coherently average the second signal over integer multiples or submultiples of a spreading sequence period of the navigation signals to form a third signal, perform circular correlation processing of the third signal with a representation of each navigation signal of the navigation signals and determine a timing offset at which a correlated output energy is maximized, based on the circular correlation processing.

DETAILED DESCRIPTION OF THE PREFERRED EMBODIMENT

Figure 1:
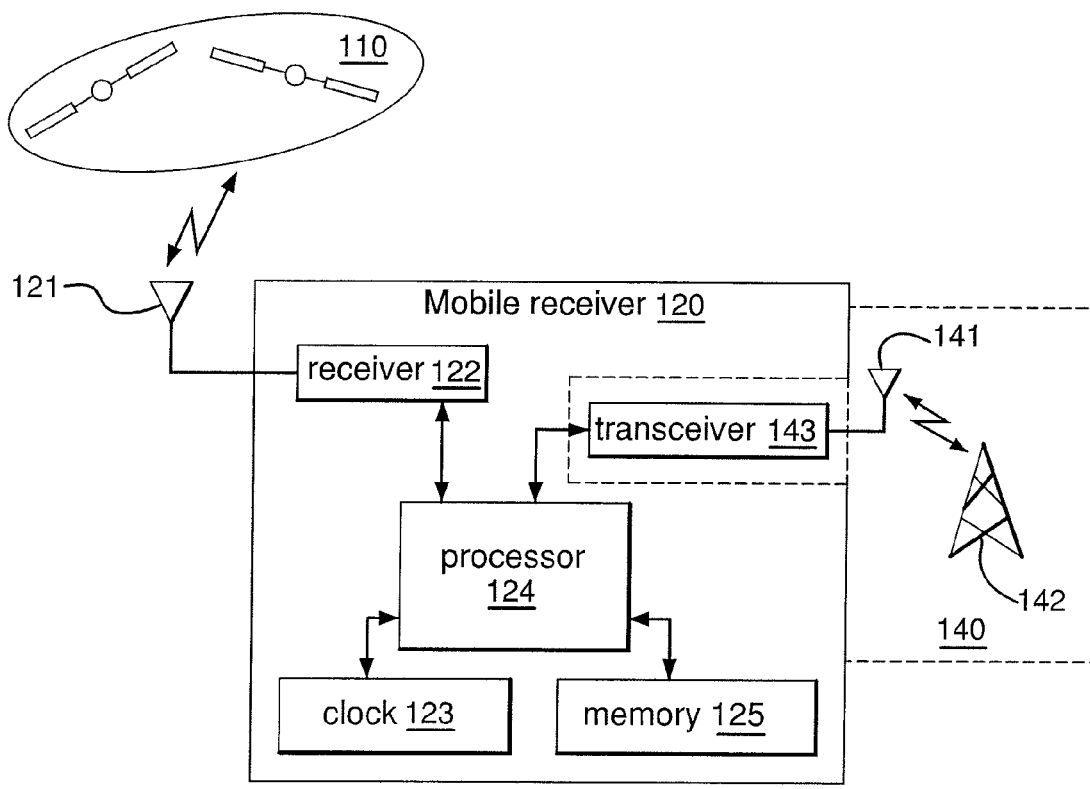
FIG. 1 is a schematic of a communication system according to the present invention.

A preferred embodiment of the present invention will be set forth in detail with reference to the drawings, in which like reference numerals refer to like elements or operational steps throughout.

The communication methods used in satellite navigation systems and a receiver for processing those signals, according to at least one embodiment, are illustrated in FIG. 1. A mobile receiver 120 communicates with multiple satellites 110 through an antenna or antennas 121. The received signals are processed through the receiver module 122 and forwarded to the processor 124. The processor 124 has access to memory 125 and has a reference clock 123 that is used in the processing of the signals. Additionally, the processor 124 of the mobile receiver 120 may also have access to a transceiver 143, that is used to send and receive other signals, through an antenna 141 to other sources 142, in the terrestrial arena 140. The other sources can, in some embodiments, be used to determine and track the signal carrier phase to enable data demodulation.

The basic acquisition technique according to the present invention is as follows:

A. Form a first signal by down-conversion of the received navigation signals to complex baseband;

B. Form a second signal by nonlinear processing of the digitized samples of the first signal, where the processing consists of forming the weighted sum of products of pairs of the digitized samples at different relative delays, in which one of each pair has been complex conjugated;

C. Form a third signal by coherent averaging of the second signal over integer multiples or submultiples of the spreading sequence period(s) of the navigation signals of interest;

D. For each navigation signal of interest, perform circular correlation processing of the third signal with a representation of the navigation signal of interest which has been processed as in step B, and determine the timing offset at which the correlated output energy is maximized.

In its simplest form, the second signal formed by differential processing in step B is the product of the samples of the first signal with delayed, complex conjugated samples of the first signal. This is a well known technique of phase differencing. It should also be noted that the order of operations above is given as down-conversion followed by digitization followed by nonlinear processing of the digitized samples. There may be a further downconversion step after digitization, for example. In either case, the representation of the signal should be complex baseband (aka in-phase and quadrature) for the nonlinear processing step. This representation could be accomplished before or after digitization.

When applied with a GPS signal as an input, the phase-differenced signal has the following properties: 1) Due to the phase differencing, the output signal is not affected by the carrier phase of the input signal. 2) The phase of the desired navigation output signal is proportional to the residual carrier frequency of the input signal after downconversion, and to the delay between the input samples used to form the phase difference signal. Specifically $$\phi = \pm \frac{2\pi D f_c}{f_s},$$

where $\phi$ is the phase in radians, D is the delay between input samples in integer increments of the sampling period, $f_c$ is the residual carrier frequency, and $f_s$ is the sampling frequency. The sign depends on which of the input samples is conjugated, and whether the sample pair spans a navigation bit transition. 3) The frequency of the output signal is proportional to the frequency drift of the input signal, and is extremely small. 4) The signal-to-noise ratio of the output phase-differenced signal is lower than that of the input due to squaring loss.

Although the decreased SNR is unattractive, the negligible frequency of the phase-differenced signal means that coherent integration can be performed over very long intervals. Also, because the integration is coherent, it can be performed completely before per-satellite correlation processing as shared computation, lightening the per-satellite computational burden.

In step C, time-domain coherent averaging is performed. For example, if a one millisecond averaging interval was selected, averaging was performed for N milliseconds and the sample rate was 2046000 (i.e. 2 samples per chip), then the output would consist of 2046 averaged values computed as:

$$A_k = \sum_{i=0}^{N-1} D_{2046i+k}, k = 0 \ldots 2045.$$

In this equation $A_k$ is the third (averaged) signal of step C, while D is the second (phase-differenced) signal of step B, output at a sample rate of 2046000 per second.

The choice of time-domain averaging interval in step C depends on the signals of interest and on available memory. For example, both GPS C/A and SBAS signals have pseudonoise sequence repetition periods of 1 millisecond, so averaging over a one millisecond interval is a natural choice. If the size of the averaging memory needs to be kept small, then a shorter integer-submultiple averaging period would be advantageous, for example 500 or 250 microseconds. In these cases there are two- and four-fold timing ambiguities respectively with GPS C/A and SBAS signals. Although no detailed or final Galileo system specification has yet been publicly released, the pseudonoise sequence repetition period for the open access signal at 1575.42 MHz has been reported to be 4 milliseconds. In this case an averaging interval of one millisecond might be chosen, which would provide unambiguous synchronization to the GPS C/A and SBAS pseudonoise sequences and four-fold-ambiguous synchronization to the Galileo pseudonoise sequence.

The representative signal with which the processed received signal is correlated in step D of the basic acquisition technique is a representation of an ideal navigation signal of interest after being passed through the nonlinear processing of step B. The signal is processed in a circular manner to generate the correlation signal.

For example, consider differential processing of the signal from GPS PRN 1 at a sample rate of 2046000 samples per second (two samples per chip), where the nonlinear processing consists of multiplying a sample with the complex conjugate of the sample which came two samples (one chip) before. The spreading sequence for PRN 1 is 1023 chips long starting with 11001 . . . and ending with . . . 10000. At two samples per symbol, an idealized baseband BPSK representation of this is the 2046-sample sequence $S_1$=[−1 −1 −1 −1 1 1 1 1 −1 −1 . . . −1 −1 1 1 1 1 1 1 1 1], where the choice has been made to map binary 0 and 1 to +1 and −1 respectively in the baseband signal. The nonlinear-processed idealized correlation waveform is then $D_1$=[1 1 1 1 −1 −1 1 −1 −1 . . . −1 −1 1 1 1 1 1 1].

In this sequence, the first sample was generated by multiplying the first sample of $S_1$ with the second-last sample of $S_1$; the second sample was generated by multiplying the second sample of $S_1$ with the last sample of $S_1$; the third was generated by multiplying the third sample of $S_1$ by the first sample of $S_1$; and so on. Since the idealized baseband signal is real, complex conjugation is not necessary.

Correlation processing can be performed in the time domain or in the frequency domain. In the time domain, the most convenient representation of the signals is with an integer number of samples per chip as in the example above. For frequency domain processing, the most convenient representation of the sequence would have a number of samples which is a power of 2, enabling the use of efficient, low complexity FFTs.

One procedure to generate the frequency domain sequences for correlation is to start by computing a time domain sequence having an integer number of samples per chip, and then using well established resampling techniques such as interpolation/decimation filtering to increase the sample rate such that the number of samples in the correlation waveform is a power of 2. The resulting sequence is then time-reversed and converted to the frequency domain via an FFT for frequency domain correlation with the received signal.

The phase angle of the differential signal is proportional to the delay between the taps used for the nonlinear processing in step B, and to the residual carrier frequency after downconversion to complex baseband form. This can be used to advantage to reduce computation.

For short delays and/or small residual carrier frequencies, the phase-differenced signal has a very small imaginary component which can be discarded. In this case the time-domain averaging and correlation processing of steps C and D can be performed on a real signal, significantly reducing computation. In a more general case, the delay and residual carrier frequency can be selected so that the signal falls near either the real or imaginary axis of the complex plane, in which case one of either the real or imaginary components can be discarded.

Even if the frequency plan and delay do not cause the signal to fall near the real or imaginary axis, computation can be simplified in other ways. One technique is to discard the real or complex part of the phase difference signal even though the signal does not fall on or near either the real or imaginary axis. Although this will cause a decrease in SNR, this may be acceptable in many applications. In the worst case the SNR will decrease by 3 dB; in most practical cases the loss will be less than this, especially because cross-correlation interference from different navigation signals than the one of interest will also have similar phase angles to the signal of interest, after the non-linear differential processing of step B and with short differencing delays. An example of this can be seen in FIG. 2, which is a scatter plot of the complex output of the correlation processing of step D, in which the input signal had a residual frequency offset of 96 kHz after downconversion and in which the phase-differencing delay was one microsecond. The distribution of the output points is approximately elliptical, with dominant contributions from thermal noise on the minor axis and auto- and cross-correlation interference on the major axis.

Alternatively, an off-axis complex signal could be rotated on the complex plane so that the signal falls on or near the real or imaginary axis. This rotation could be performed either between steps B and C or between steps C and D of the basic algorithm, following which the redundant signal component could be discarded.

The impact of navigation data bit transitions depends on the phase differencing delay. For short delays, the bit transitions can be ignored. For example, with GPS there is a bit transition every 40 milliseconds, on average. In this case, with a one chip (approximately 1 microsecond) phase differencing delay there is a random phase reversal of the phase difference signal lasting 1 microsecond and occurring on average once every 40 milliseconds; this leads to an average loss of $2 \times 10^{-4}$ dB which can be accepted. Longer delays will cause increased loss which can be compensated by increasing the overall averaging period.

Due to Doppler shift and receiver clock frequency error, the timing of the pseudonoise sequence from each satellite will have some drift. For example, GPS satellites typically have chip drift rate offsets from the nominal chip rate in the range of ±2.5 parts per million or more, just from the relative Doppler shift. The net effects will be to increase timing uncertainty and to decrease correlation energy, as the correlation energy of a signal is spread over more samples than in the nominal case. If the coherent averaging interval is short, chip timing drift can be ignored; for longer averaging or for best accuracy, chip timing drift needs to be handled.

Given a hypothesized chip timing drift rate, one way to compensate for the drift is to adjust the timing of the coherent averaging interval to match. This could be done by deleting samples from or inserting samples into the phase-differenced stream being averaged in a controlled manner dictated by the hypothesized drift rate.

Another way of dealing with chip timing drift is to use an approach in which multiple coherently averaged sections generated as in step C are passed through delay/advance filters. Each section would be averaged for a relatively short time, over which chip timing drift could be ignored. Each of these sections would then be filtered with a different delay or advance which would be proportional to the time difference between the start of averaging for each section and a reference time, as well as the hypothesized chip drift rate. These filters would be used to adjust the signal timing to the reference time (most conveniently near the beginning or the end of measurement, but any time could be used) such that the effect of chip timing drift is cancelled.

As a concrete example, consider such a system being used to receive a GPS signal with a +2.5 ppm drift rate (the sense of the sign is that the chip sequence is slightly faster than nominal), in which the received signal is averaged in step C of the basic acquisition technique 50 times with a 1 ms averaging interval. The 50-millisecond-averaged sections are each filtered to delay or advance the signal within the section, and 20 such filtered sections are added so that integration is effectively performed over a one second interval. In this case with the +2.5 ppm chip drift rate, the pseudonoise sequence advances 0.127875 chip between each subsequent 50 millisecond averaging interval, and 2.5575 chips over the one second overall integration period. If the last 50 millisecond section is unfiltered, the second-last is filtered with a filter providing a delay of 0.127875 chip periods (or 125 ns delay), the third-last is filtered with a filter providing 250 ns delay, and so on up to the very first 50 ms section which is filtered with a filter providing 2375 ns of delay, and the outputs of the filters are summed to provide a drift-compensated one millisecond long averaged data record, then the net effect is to cancel the effect of the +2.5 ppm chip timing drift (except for the small amount of drift over each 50 ms averaging intervals). The reference time to which all the sections are adjusted is 25 ms before the end of the one second averaging interval in this case.

Figure 3:
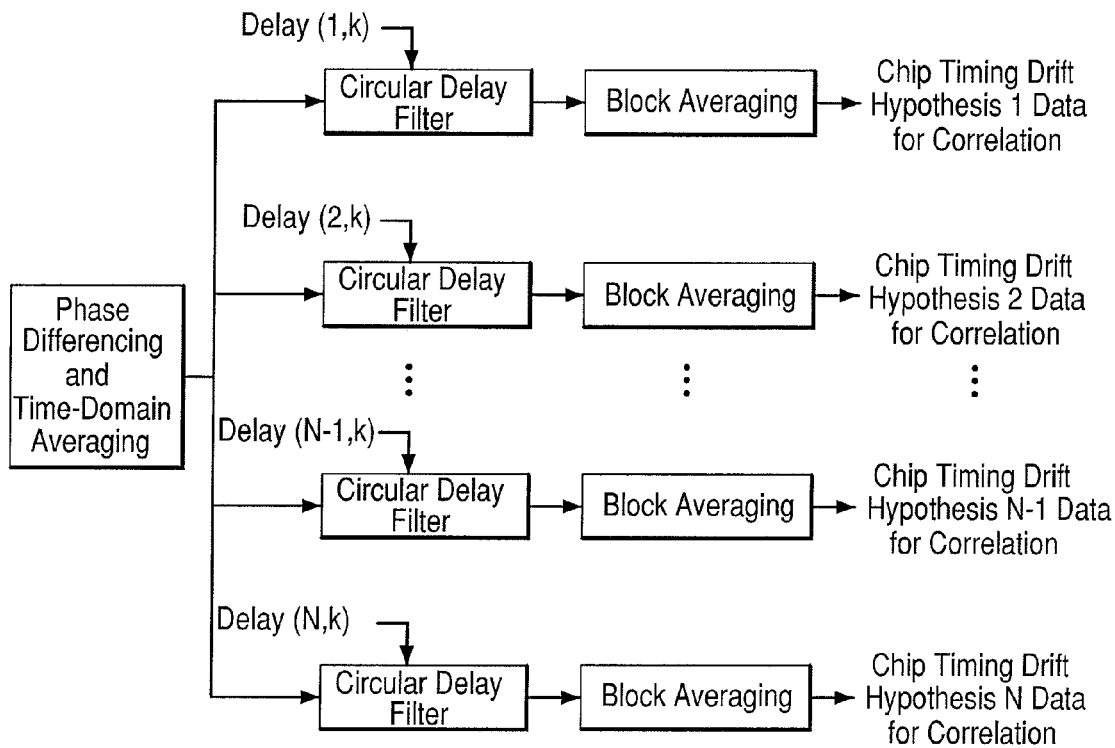
FIG. 3 is a schematic the processing of matching multiple chip timing drift hypotheses, according to embodiments of the present invention.

Typically it will be desirable to perform correlation processing for navigation signals at different chip timing drift rates. Even if the drift rates are known beforehand, usually signals from different satellites will have different drift rates and the receiver drift rate will be unknown, so it will be beneficial to perform processing at a number of different rates. If the drift rates are not well known, the benefits are even stronger. Given a system which performs the phase-differencing and time-averaging with a controllable relative drift rate using one of the techniques outlined here, processing could be performed in a serial manner for each hypothesized drift rate of interest; alternatively, the search could be performed in parallel by running several such systems simultaneously with different programmed drift rates. This approach is shown in FIG. 3 for N different chip timing drift hypotheses; in this figure k is an index indicating which time-averaged section is being filtered before further block averaging.

Typically the correlation processing performed in step D of the basic acquisition scheme would be performed in a circular manner, either in the time domain or in the frequency domain via FFT-multiplication-IFFT. In this case the delay-advance filters would need to be circular as well—for example with a filter providing exactly one sample of delay, the second output sample would be equal to the first input sample, the third output sample would be equal to the second input sample and so on, while the first output sample would be equal to the last input sample. This means that without loss of generality the delay/advance filters could be implemented as all delays, or all advances, as a design choice. For example, with circular filtering of a 2046-sample buffer, a filter providing a 4.5 sample advance would give the same output as a filter providing a delay of 2041.5 samples.

Typically the delay filter would be implemented for a given desired delay using a combination of finite impulse response timing interpolation filtering and input or output memory pointer offsets. The taps of the timing interpolation filter would be selected or computed to provide a desired fractional-sample delay which could be varied from 0 to 1 sample. This filter would typically also have an integer sample delay. The overall delay would be achieved by computing the start input offset from the desired integer delay and the filter integer delay, and then computing each output sample as a weighted sum of a set of a portion of the input samples the first of which is pointed to by the input memory pointer, incrementing the input memory pointer and output memory pointer by one (in a circular manner) for each output sample.

The code phase (pseudonoise sequence relative timing) and amplitude can be estimated by searching over the chip timing drift rate and timing hypotheses to find the peak value. The estimated amplitude can be formed as the difference between the peak value and the mean value, while the code phase is determined from the relative time offset of the peak within the detection output sequence.

Once the best chip timing drift rate and peak timing offset have been found, an improved estimate can be formed by polynomial curve fitting. For example, using data from the output sequence at the best chip timing drift rate, a parabola could be fit to the points around the peak, either as a direct solution (three points centered on the peak) or as a least-squares solution (more than three points centered on the peak). The improved peak timing estimate and amplitude can then be determined from the parabola coefficients.

In many cases it will be of interest to perform carrier frequency estimation on the navigation signals, both for the information they can provide on receiver velocity as well as for demodulator initialization (in unaided receivers). Within the context of the differential acquisition technique there are several ways this can be done.

Once the timing of the pseudonoise sequence has been estimated using the differential technique, the carrier frequency could be estimated for each navigation signal of interest by despreading the complex baseband input signal with a synchronized code. Typically this would be followed by sample decimation and frequency estimation using one of a number of well-known techniques (e.g. FFT).

Another technique is to derive the carrier frequency from the chip timing drift rate. GPS transmitters coherently derive the carrier and chip frequencies from a single clock source, while SBAS transmitters are constrained to 50 parts per trillion of relative fractional error between the code and carrier frequencies over 10 seconds. No Galileo specification has been published at this time but it is expected that the code and carrier frequencies will be derived coherently from a single source as in the GPS satellites. If a receiver is designed so that its RF local oscillator(s) and navigation signal sampling clock are derived from a single clock source, then the chip sequences and carrier frequencies can be considered to be coherent in the receiver.

This means that the same fractional offset from the nominal value applies to each of the code and carrier frequency. For example, if an L1 GPS signal has a code drift rate offset from nominal of +2.5 ppm, then the carrier frequency offset from the nominal value will be $2.5 \times 10^{-6} \times 1575.42 \times 10^6$, or 3939 Hz.

As the hypothesized chip timing drift rate approaches the true rate, the correlation peak changes in three ways. Firstly, the time offset of the peak changes. Secondly, the maximum value of the peak increases (with some corruption by noise and interference). Thirdly, the width of the correlation peak decreases as the correlation energy is spread over fewer samples of the correlation waveform. The second and/or third behaviors can be used in a multiple chip timing drift hypothesis receiver to select the best chip timing drift hypothesis, as the one with the largest peak or the narrowest peak. With multiple hypotheses, the chip timing drift estimate (and therefore the carrier frequency estimate) can be refined by fitting a polynomial to the peak widths as a function of timing drift and finding the value of timing drift which gives a local minimum for the polynomial. Similarly the estimate can be refined by fitting a polynomial to the peak values as a function of timing drift and finding the value of timing drift which gives a local maximum for the polynomial.

Figure 4:
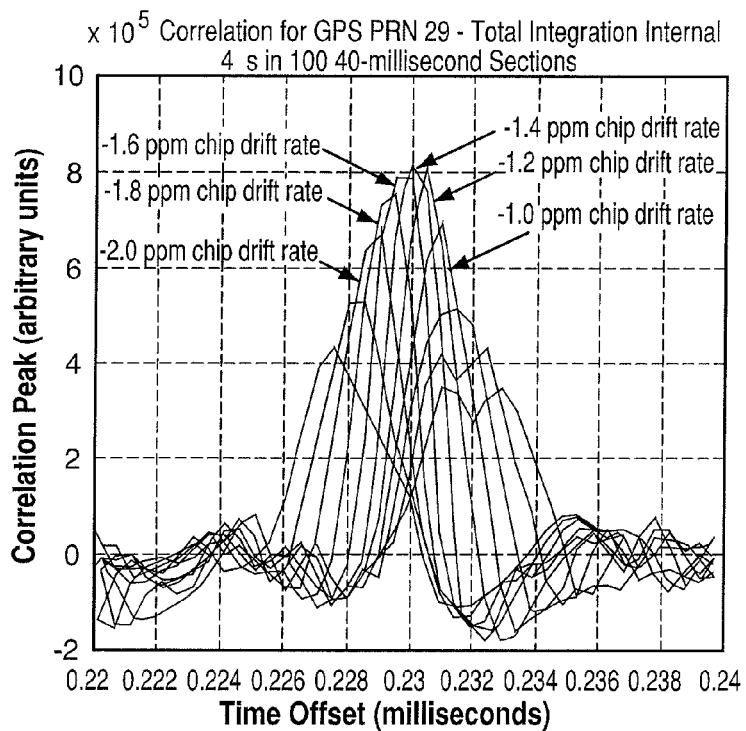
FIG. 4 is a graph illustrating multiple chip timing drift hypothesis output, according to embodiments of the present invention.
Figure 5:
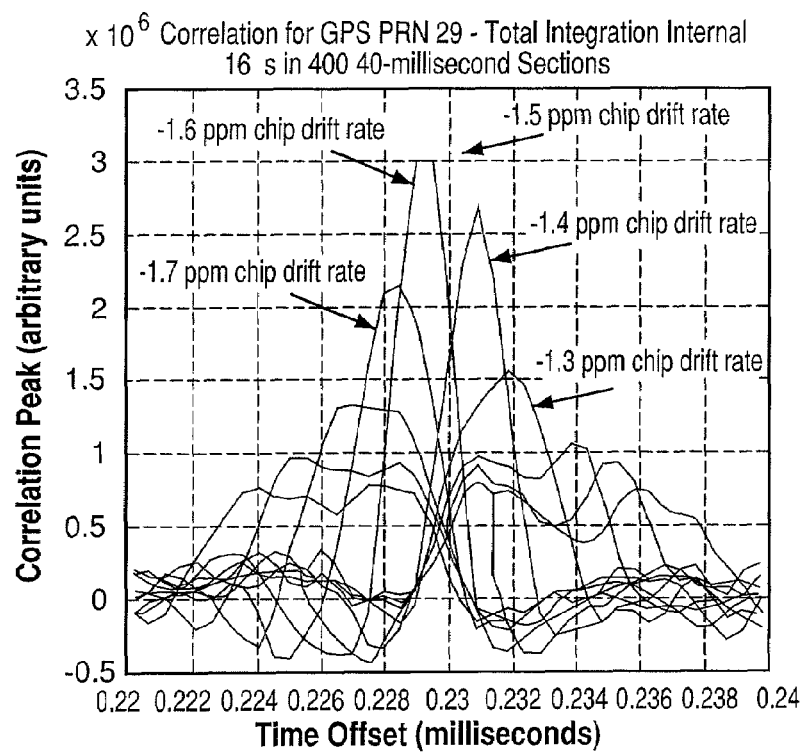
FIG. 5 is a graph illustrating additional multiple chip timing drift hypothesis output, according to embodiments of the present invention.

Some examples of correlation behavior are shown in FIGS. 4 and 5, for total integration intervals of 4 and 16 seconds, respectively, and for various hypothesized chip timing drift rates. The plots were generated by processing over one millisecond of code phase uncertainty, but only 20 microseconds of the output is displayed to show detailed behavior. It can be seen that longer integration periods provide better resolution on the chip timing drift estimates. The resolution benefit of the longer integration time can be achieved without a significant increase in computation by processing non-contiguous sections, if desired.

Figure 6:
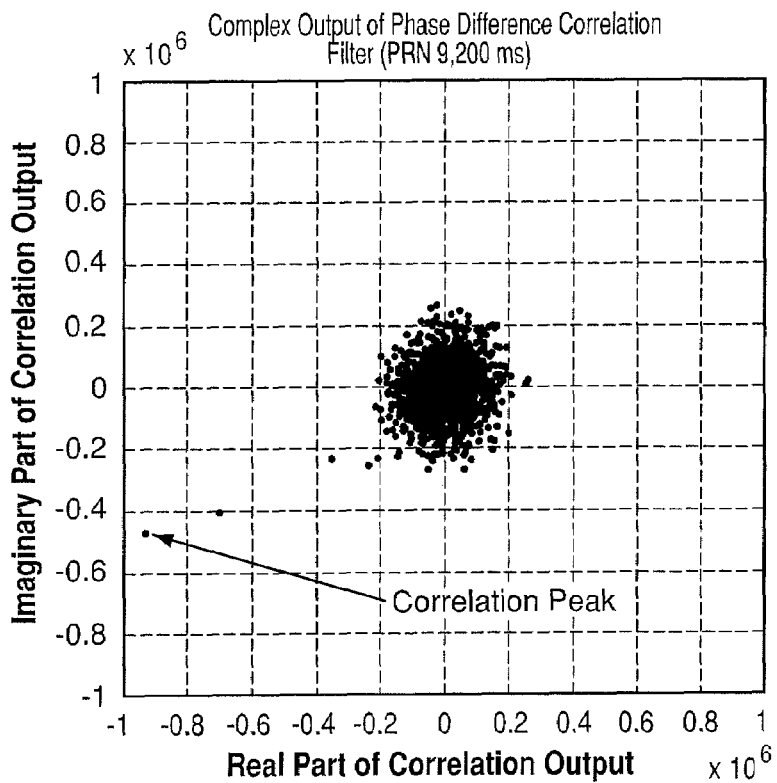
FIG. 6 is a graph providing a scatter plot of complex correlation output of the present invention.

A third technique for carrier frequency estimation is to use the phase angle of the detection peak, if long phase-differencing delays and complex processing are used. FIG. 6 is a scatter plot of the complex output of the correlation processing of step D. The nominal carrier frequency of the signal in this plot was zero; however, there was a residual carrier frequency which was to be estimated. The phase differencing delay used in the signal processing associated with this figure was 210 samples and the sample rate was 2048000, so frequency offsets from −4876 Hz to +4876 Hz map onto phase angles over the range $[-\pi, \pi]$. In this case the peak phase angle gives an estimated carrier frequency offset of −4154 Hz, which is very close to the actual frequency offset of −4126 Hz.

The chip timing drift and long-delay peak phase techniques of frequency estimation can be combined to form a reduced-error estimate in several ways. One way is to compute a weighted average of the two estimates. Another way of combining the two techniques is to use long-delay phase differencing, with chip timing drift giving a coarse but unambiguous frequency estimate and the peak phase angle giving a fine but ambiguous frequency estimate. The two estimates are combined to form a fine, unambiguous estimate.

For example, consider using these two techniques to estimate the L1 frequency offset of multiple GPS satellites, with a phase differencing delay of 1023 samples at a sample rate of 2046000 samples per second. The satellite carrier frequency offsets in this example are within the range of ±4 kHz due to Doppler shift. Given the delay and sample rate, the carrier frequencies map into the complex peak phase angle range $[-4\pi, 4\pi]$. Since the complex peak phase angle has an unambiguous range of $[-\pi, \pi]$ there is a phase ambiguity which can be resolved using the estimate obtained from the chip timing drift rate; the phase with resolved ambiguity gives an improved estimate of the carrier frequency offset as compared to the frequency estimate using an unambiguous shorter-delay phase-based estimate.

Figure 2:
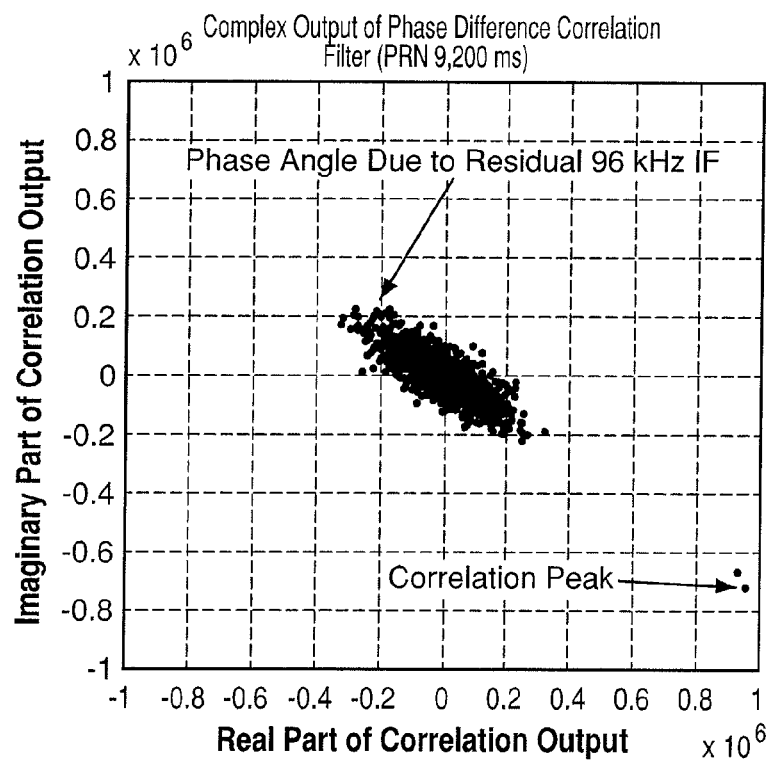
FIG. 2 is a graph providing a scatter plot of complex correlation output of the present invention.

The behavior of cross-correlation interference from navigation satellites other than the one of interest is markedly different when using long- and short-delay phase differencing, as can be seen in FIGS. 2 and 6. Since the carrier frequency offsets of the satellites are distributed over several kHz, with long-delay phase differencing and complex processing, the differences between phase angles of the cross-correlation interference and desired signal waveforms seen while processing for any given satellite will most often be large, and the noise-and-interference distribution will be closer to a two-dimensional Gaussian. This can be seen in FIG. 6 where the scatter plot points have a near-circular distribution apart from the correlation peak. For short-delay processing, the differences between phase angles of the cross-correlation signals and desired signals are small, which gives rise to the elliptical noise-and-interference distribution seen in FIG. 2. Although interference cancellation could provide benefits for either long-delay or short-delay phase-differencing acquisition schemes, a larger benefit will be seen with short-delay phase differencing.

If the relative code phase, chip timing drift rate and signal amplitude of one or more of the transmitted signals present in the received signal were known, then the effects of the known signals could be canceled out. This would allow acquisition to occur with weaker signals, which would otherwise be drowned out by stronger, more easily detected signals.

A typical procedure for single-pass interference cancellation would be:

1. Perform differential acquisition processing as outlined previously, for each satellite signal of interest;

2. Estimate the code phase, amplitude and chip timing drift;
3. Decide which signals have been detected, by comparison of the peak amplitudes with thresholds;
4. Remove the effects of the detected signals, by forming replica waveforms for each detected signal at each test chip timing drift rate based on the code phase, amplitude and signal chip timing drift offset from the test chip timing drift rate, and subtracting the replica signals; and
5. Perform acquisition processing for each previously unacquired satellite signal of interest.

Steps 4 and 5 above would only be executed if there were still undetected signals to be found.

A multi-pass procedure which has more computation but offers better performance is given below:
1. Perform differential acquisition processing as outlined previously, for each satellite signal of interest;
2. Estimate the code phase, amplitude and chip timing drift;
3. Decide which signals have been detected, by comparison of the peak amplitudes with thresholds; and
4. For each satellite signal of interest (whether previously detected or not), subtract the effect of all detected signals (except the current signal, if it was detected previously) at each test chip timing drift rate, based on the estimated code phases, chip timing drift rates and amplitudes of the detected signals. Perform detection processing for the signal, form improved estimates of the code phase, chip timing drift rate and amplitude. Form a detection decision based on comparison of the amplitude with a threshold.

The fourth step is repeated for each satellite signal of interest. It can be repeated more than once for the complete set of satellites. The improved estimates formed in each pass can be used to reduce cross-correlation interference further, which leads to even better estimates in the next pass.

Details of implementation are now discussed, where in all cases the implementation was partitioned between hardware and software. The hardware (implemented in an FPGA) performs the initial phase-differencing and time-averaging, while the software (implemented on a DSP) provides chip timing drift compensation, correlation processing, signal parameter estimation, detection decision-making and optional interference cancellation, according to at least one embodiment.

Figure 7:
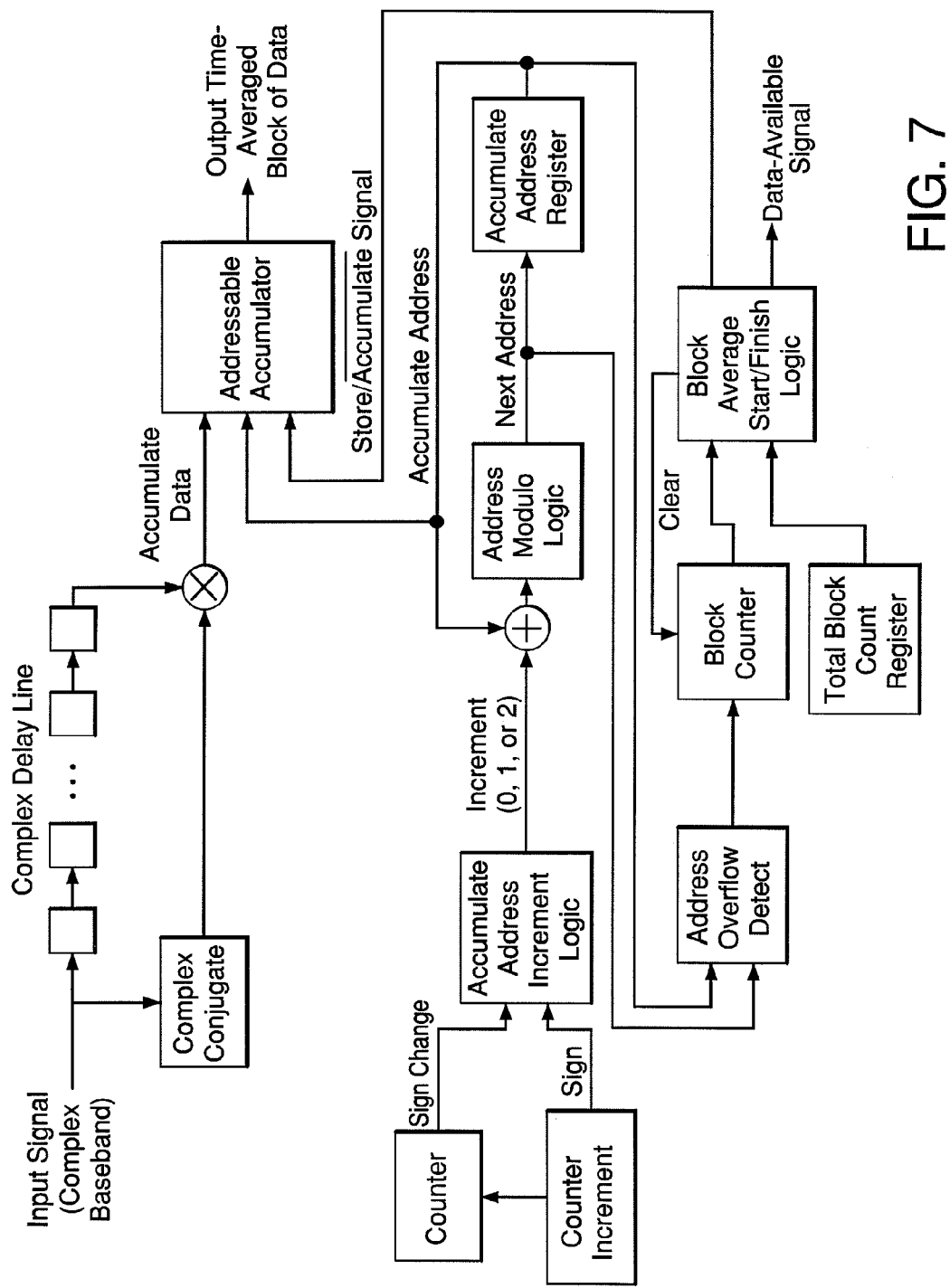
FIG. 7 is a schematic illustrating a hardware implementation of the present invention.

One hardware implementation is shown in FIG. 7, where that design is fully synchronous with the clock rate being equal to the sample rate of the input signal. In this design output sample rate control (or chip timing drift compensation) is provided by modification of the current section address (corresponding to a timing offset within the section) at which data is being accumulated.

The input signal comes in as complex baseband at the desired sample rate. Downconversion to complex baseband may occur off-chip; alternatively the input signal may be at an intermediate frequency (IF) and the final downconversion could be in a different section of the FPGA.

The complex baseband signals are phase-differenced by complex multiplication of a delayed version of the signal with the complex conjugate of the undelayed signal. Complex conjugation can be performed on either the delayed or undelayed branch (but not both). The phase-differenced output can consist of the real or imaginary portion of the product, or both, depending on whether it is intended to process the output as real or complex data.

The phase-differenced signal is an input to an addressable accumulator. This module consists of an addressable memory to which data is either loaded or added. This module has two other inputs—the address of the data to be loaded/added to, and an input which controls whether the data is loaded or accumulated. Typically the input will be configured to load during the first pass through a section only, so that unwanted initial data within the accumulator doesn't corrupt the output. The number of addressable memory cells within the accumulator is greater than or equal to the number of samples in the time-averaged section. For example, if the sample rate is 2048000 per second and the averaging interval is 1 ms, then the accumulator would have 2048 addressable cells; if the sample rate was 2046000, the averaging interval was 1 ms and the desired number of samples per block was 2046 (for easy time-domain correlation) then the number of cells might be 2046 or 2048 (given that many implementations will be easier with powers of 2).

The addresses for the accumulator are generated by a counter which is incremented on every clock cycle by 0, 1 or 2. The address is incremented with modulo arithmetic; if the number of time-averaged samples in the output section is not a power of two, this needs to be explicitly designed in (for example to force increments modulo 2046 if the number of samples is 2046); if the number of samples is a power of two, then the address counter can be allowed to overflow naturally. The counter increment is controlled by another counter (acting as a numerically controlled oscillator, or NCO) which has a programmable increment. The NCO counter represents a signed binary number which can overflow freely without saturation. On each clock cycle the NCO increment is added to the NCO counter. If this does not cause a sign change in the NCO counter, then the address counter is incremented by 1. If it causes a sign change then the address counter is incremented by 2 if the sign of the counter increment is positive, and by 0 if the sign of the counter increment is negative. The increment is added to the current accumulate address (in a modulo manner as previously described) to form the next accumulate address. The effect of this is to jitter the accumulate address to achieve the desired effective sample rate.

Each time the accumulate address register overflows, a block counter is incremented. The block counter and a total block count register are inputs to the block average start/finish logic. This logic has three outputs. When the block counter value is 0, it sends a signal to the addressable accumulator to load, rather than accumulate, the input signal data. This state holds for the first pass through the block, at the end of which the block counter increments to 1 and the signal changes state to tell the addressable accumulator to accumulate. The second output is a data-available signal to a microprocessor (e.g. DSP). This is asserted when the block counter reaches the value within the block count register. The software within the microprocessor knows that it can read valid time-averaged data after this signal is received. At the same time, a clear signal is asserted to the block counter. This signal tells the block counter to reset to zero, rather than incrementing by one, the next time the accumulate address register overflows.

Figure 8:
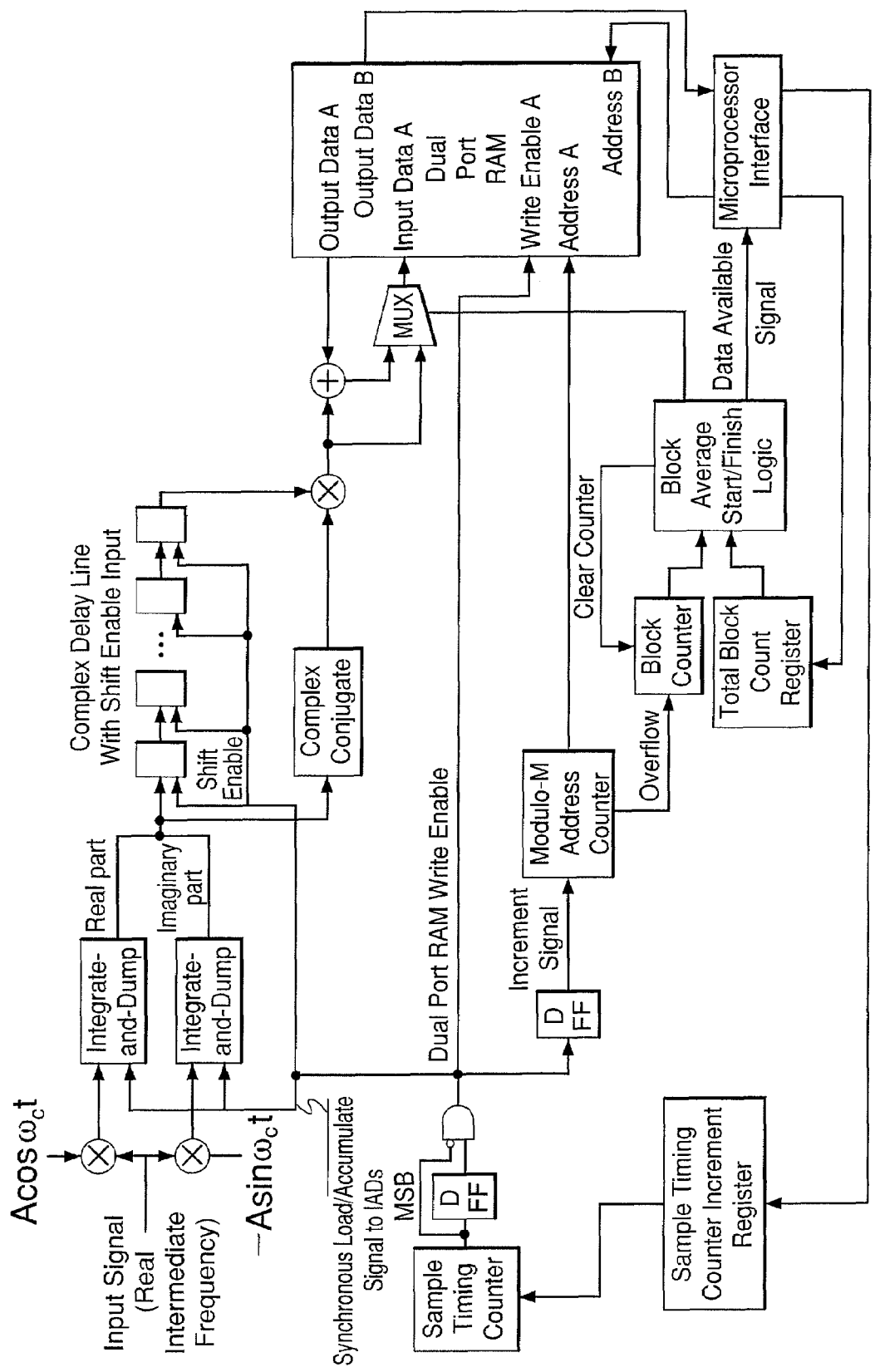
FIG. 8 is a schematic illustrating an alternate hardware implementation of the present invention.

For example, consider a GPS receiver with time averaging over 1 ms blocks, with 40 milliseconds between the start of each averaging interval. The block count register is programmed to 39, and the block counter counts from 0 to 39 before repeating. During the first millisecond in each 40 millisecond section, the addressable accumulator stores the data rather than accumulating it; this clears the averaged signal from the previous section. For the $2^{nd}$ through $40^{th}$ milliseconds, the data is accumulated. After 39 milliseconds, the data-available signal to the microprocessor is asserted, and the microprocessor has 1 millisecond to read the data before the next section starts. At the end of the $40^{th}$ millisecond, the block counter is reset to 0 and the process repeats An improved hardware implementation is shown in FIG. 8. The improvement is in the area of sample rate control; the signal is oversampled and decimated, with sample jitter applied to the oversampled signal before decimation to achieve the desired sample rate. This reduces the timing jitter on the output signal by the mean decimation ratio. In this implementation, the input signal is real at an intermediate frequency and is explicitly downconverted within the FPGA; also, a more detailed implementation of an addressable accumulator is shown. This implementation is fully synchronous logic running with a clock at the undecimated sample rate; register outputs change state on the rising edge of the clock.

The input signal comes in as real samples at some intermediate frequency; they are downconverted to complex baseband and decimated via a complex integrate-and-dump filter. The output of the integrate-and-dump filter is passed through a complex delay line. The phase differenced signal is formed as in the previous implementation.

The sample rate is controlled by a counter with a programmable phase increment, as in the previous implementation. The output is a pulse which is high for a single clock cycle when there is a change in the most significant bit of the sample timing counter from 1 to 0. This pulse output is used in different subsystems for different purposes. For the integrate-and-dump filters, the pulse indicates that the current inputs should be loaded rather than accumulated; the new data will appear on the outputs of the IADs on the rising edge of the clock. In the complex delay line, the pulse is used as a shift enable signal. In the dual-port RAM which forms a portion of the addressable accumulator, the pulse is used as a write enable signal. Finally, the pulse (delayed by one clock cycle with a D flipflop) is used as an increment enable signal to the accumulate address counter.

The effective sample rate of the output is controlled by the sample timing counter increment register. Sample rates from 0 Hz to half the clock frequency can be set, in a resolution that is set by the sizes of the counter and increment register. For example, consider an implementation in which the sample timing counter and its increment register are each 32 bits wide, and are clocked at 16.367 MHz. If the increment register is programmed to 0x20000000 (where "0x" denotes that the number which follows is in hexadecimal notation), then the effective sample rate is 16.367 MHz/8, or 2.045875 MHz. If the increment register is programmed to 0x20008022, the effective sample rate is 2045999.99987 Hz, which is very close to 2046000—a convenient sample rate if time domain correlation is to be used. If the increment register is programmed to 0x20088243, the effective sample rate is 2048000.001523 which is very close to 2048000, a convenient sample rate if frequency domain correlation is to be used via FFT. The available resolution is 16.367 MHz/$2^{32}$, or 3.81× $10^{-3}$ Hz. If the sample timing counter increment were to be used for chip timing drift compensation, at 2 samples per chip this design would offer $$\frac{3.81 \times 10^{-3}}{2 \times 1023000} \times 10^9 = 1.86$$

parts per billion resolution on the chip timing drift.

The address counter, block counter and block average start/finish are as they were in the previous version, except that the address counter always increments by 1 (modulo M, where M is the number of averaged samples in the block) and it only increments in cycles in which the increment signal is asserted.

The dual port RAM, multiplexer and adder form an addressable accumulator. Port A of the dual port RAM is used to perform addressed accumulation, while port B is used by the microprocessor to access the accumulated data. The DPRAM is synchronous, with the same clock as the rest of the circuitry. Data stored in the cells only changes on the rising edge of the clock, in cycles in which the write enable A signal is asserted. The microprocessor interface is read-only.

The read/write address is taken from the output of the address register. The write data is selected by the multiplexer to be either the phase-differenced signal or the sum of the phase-differenced signal and the contents of the DPRAM cell referenced by the address. The sum would be selected for accumulation, while the phase-differenced signal alone would be selected on the first averaging pass.

The software implementation performs the following processing steps: 1) common pre-processing, 2) per-satellite acquisition processing and 3) optional interference cancellation and improved per-satellite acquisition processing.

The pre-processing step consists of reading the time-averaged sections from the FPGA as they become available. This step can optionally also include circular delay filtering used for multiple hypothesis chip timing drift estimation as previously described. This step ends when the desired number of sections has been read from the FPGA, and passed through the optional circular delay processing. The per-satellite acquisition processing step consists of the correlation processing and signal parameter estimation which has been previously described. The optional interference cancellation processing has been previously described.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A method of acquiring signals from satellites in a Global Positioning System (GPS), the method comprising:
   receiving navigation signals from the satellites of the GPS;
   down-converting to complex baseband the received navigation signals to form a first signal;
   digitizing samples of the first signal;
   nonlinear processing of the digitized samples of the first signal to form a second signal, where the nonlinear processing comprises forming a weighted sum of products of pairs of the digitized samples at different relative delays, in which one of each of the pairs has been complex conjugated;
   coherent averaging the second signal over integer multiples or submultiples of a spreading sequence period of the navigation signals to form a third signal;
   performing circular correlation processing of the third signal with a representation of each navigation signal of the navigation signals; and
   determining a timing offset at which a correlated output energy is maximized, based on the circular correlation processing.

2. A method of acquiring signals from satellites according to claim 1, wherein the step of nonlinear processing further comprises discarding an imaginary component of the second signal for short delay periods or small residual carrier frequencies.

3. A method of acquiring signals from satellites according to claim 1, further comprising rotating, on a complex plane, at least one of the second signal and the third signal so that the at least one signal falls on or near a real or an imaginary axis of the complex plane.

4. A method of acquiring signals from satellites according to claim 1, further comprising:
   determining a chip timing drift rate for each of the received navigation signals; and
   inserting or deleting samples in the digitizing samples step to compensate for the chip timing drift rate.

5. A method of acquiring signals from satellites according to claim 1, further comprising:
   determining a chip timing drift rate for each of the received navigation signals; and
   passing multiple coherently averaged sections of the first signal though delay and advance filters to compensate for the chip timing drift rate.

6. A method of acquiring signals from satellites according to claim 1, further comprising estimating a carver frequency the received navigation signals by despreading the first signal with synchronized code.

7. A method of acquiring signals from satellites according to claim 1, further comprising estimating carrier frequencies of the received navigation signals by determining a chip timing drift rate for each of the received navigation signals.

8. A method of acquiring signals from satellites according to claim 1, further comprising estimating carrier frequencies of the received navigation signals by determining a phase angle of a detection peak of the third signal for each of the received navigation signals.

9. A method of acquiring signals from satellites according to claim 1, the method further comprising performing at least one single-pass interference cancellation process for each navigation signal.

10. A method of acquiring signals from satellites according to claim 9, the step of performing a single-pass interference cancellation process comprising:
    estimating a code phase, an amplitude and a chip timing drift for each navigation signal;
    comparing peak amplitudes of each navigation signal with thresholds;
    forming replica waveforms for each navigation signal at a test chip timing drift rate, based on the code phase, the amplitude and the chip timing drift, and offset from the test chip timing drift rate, and
    subtracting the replica waveforms from the navigation signals.

11. A receiver for acquiring signals from satellites in a Global Positioning System (CPS), the receiver comprising:
    at least one antenna;
    a receiver, connected to the at least one antenna, configured to receive navigation signals from the satellites of the GPS; and
    a processor, in communication with the receiver;
    wherein the processor is configured to down-convert to complex baseband the received navigation signals to form a first signal, digitize samples of the first signal, process, nonlinearly, the digitized samples of the first signal to form a second signal, where the nonlinear processing comprises forming a weighted sum of products of the digitized samples at different relative delays, in which one of each of the pairs has been complex conjugated, coherently average the second signal over integer multiples or submultiples of a spreading sequence period of the navigation signals to form a third signal, perform circular correlation processing of the third signal with a representation of each navigation signal of the navigation signals and determine a timing offset at which a correlated output energy is maximized, based on the circular correlation processing.

12. A receiver according to claim 11, wherein the processor is configured to discard an imaginary component of the second signal for short delay periods or small residual carrier frequencies.

13. A receiver according to claim 11, wherein the processor is configured to rotate, on a complex plane, at least one of the second signal and the third signal so that the at least one signal falls on or near a real or an imaginary axis of the complex plane.

14. A receiver according to claim 11, wherein the processor is configured to:
    determine a chip timing drift rate for each of the received navigation signals; and
    insert or delete samples in the digitizing samples step to compensate for the chip timing drift rate.

15. A receiver according to claim 11, wherein the processor is configured to:
    determine a chip timing drift rate for each of the received navigation signals; and
    passing multiple coherently averaged sections of the first signal though delay and advance filters to compensate for the chip timing drift rate.

16. A receiver according to claim 11, wherein the processor is configured to estimate a carrier frequency the received navigation signals by despreading the first signal with synchronized code.

17. A receiver according to claim 11, wherein the processor is configured to estimate carrier frequencies of the received navigation signals by determining a chip timing drift rate for each of the received navigation signals.

18. A receiver according to claim 11, wherein the processor is configured to estimate carrier frequencies of the received navigation signals by determining a phase angle of a detection peak of the third signal for each of the received navigation signals.

19. A receiver according to claim 11, wherein the processor is configured to perform at least one single-pass interference cancellation process for each navigation signal.

20. A receiver according to claim 19, wherein the processor is configured to perform the at least one single-pass interference cancellation process comprising:
    estimating a code phase, an amplitude, a detection decision state and a chip timing drift for each navigation signal;
    comparing peak amplitudes of each navigation signal with thresholds;
    forming replica waveforms for each navigation signal at a test chip timing drift rate, based on the code phase, the amplitude, the detection decision state and the chip timing drift, and offset from the test chip timing drift rate, and
    using the replica waveforms to refine the navigation signals.

21. A method of acquiring signals from satellites in a Global Positioning System (GPS), the method comprising:
    receiving navigation signals from the satellites of the GPS;
    providing a digitized complex baseband representation of the received navigation signals as a first signal;

nonlinear processing of the first signal to form a second signal, where the nonlinear processing comprises forming a weighted sum of products of pairs of digitized samples at different relative delays, in which one of each of the pairs has been complex conjugated;

coherent averaging the second signal over integer multiples or submultiples of a spreading sequence period of the navigation signals to form a third signal;

performing circular correlation processing of the third signal with a representation of each navigation signal of the navigation signals; and determining a timing offset at which a correlated output energy is maximized, based on the circular correlation processing.

* * * * *